United States Patent [19]
Stephany et al.

[11] Patent Number: 5,823,858
[45] Date of Patent: Oct. 20, 1998

[54] FIELD REPLACEABLE SPINDLE ASSEMBLY FOR A LASER WRITER

[75] Inventors: Thomas M. Stephany, Churchville; William Mey, Rochester; William E. Schmidtmann, Naples; Thomas G. Lodadio, Rochester, all of N.Y.

[73] Assignee: Eastman Kodak Company, Rochester, N.Y.

[21] Appl. No.: 409,553

[22] Filed: Mar. 23, 1995

[51] Int. Cl.$^6$ ....................................................... B24B 5/01
[52] U.S. Cl. ................................................ 451/49; 451/58
[58] Field of Search ................................ 451/49, 58, 55, 451/385, 246, 249

[56] References Cited

U.S. PATENT DOCUMENTS

| | | | |
|---|---|---|---|
| 2,034,507 | 3/1936 | Colson | 451/246 |
| 2,525,591 | 10/1950 | Cotchett | 451/49 |
| 5,616,068 | 4/1997 | Soderberg | 451/49 |

*Primary Examiner*—Robert A. Rose
*Attorney, Agent, or Firm*—Peyton C. Watkins

[57] ABSTRACT

A process for manufacturing a field replaceable laser writer spindle assembly having a shaft with two ball bearings and a spindle head, comprises the steps of preloading both ball bearings to a predetermined level. The spindle head is rotated about a longitudinal axis of the spindle assembly, and a reference surface of the spindle head is ground to a predetermined tolerance for minimizing runout of the reference surface for producing the field replaceable spindle assembly.

6 Claims, 2 Drawing Sheets

5,823,858

FIELD REPLACEABLE SPINDLE ASSEMBLY FOR A LASER WRITER

CROSS-REFERENCE TO RELATED APPLICATIONS

The present application is related to U.S. application Ser. No. 08/391,796, filed Feb. 21, 1995, by Thomas M. Stephany and William Mey, and entitled, "A METHOD FOR CREATING A MULTI-FACETED POLYGON FOR A LASER WRITER".

FIELD OF THE INVENTION

The invention relates generally to the field of spindle assemblies for laser writers and, more particularly, relates to a field replaceable spindle assembly for a laser writer.

BACKGROUND OF THE INVENTION

In laser printing devices, such as laser printers, copiers and similar devices, a laser beam is directed onto a multi-faceted polygon having a plurality of reflecting surfaces for permitting each surface to reflect the laser beam onto a recording medium, such as film or photographic paper. A circular hole passes through the center of the polygon for receiving a shaft of a spindle assembly which rotates the polygon at a constant predetermined velocity. As the polygon is rotated within the printing device, each surface of the polygon successively writes one complete line on the recording medium.

Ideally, each surface of the polygon writes onto the recording medium with a constant exposure level to eliminate creating artifacts on the recording medium due to having various exposure levels for each line. To provide this constant exposure level, the intensity of the beam and the time it takes for each reflecting surface to write a complete line must remain constant throughout the entire writing process. The beam intensity is relatively easy to maintain at a constant rate as is well known in the art; however, if one wishes to replace the polygon or its associated rotating mechanism in the laser printer (i.e., the spindle assembly), maintaining a constant reflection or writing time for each reflecting surface is time consuming, difficult, labor intensive and expensive, as is described in detail below.

A solution for replacing the polygon is discussed in co-pending and commonly owned U.S. patent application Ser. No. 08/391,796, which is incorporated by reference. However, if the spindle assembly requires replacement, the entire laser writer must be sent back to the manufacturer for replacement and alignment. It is obvious that, if there is misalignment of the spindle assembly which, in turn, causes the polygon to become tilted or otherwise misaligned, the writing time may vary from one reflecting surface to another reflecting surface which results in degraded writing quality.

Consequently, a need exists for a field replaceable spindle assembly for a laser writer.

SUMMARY OF THE INVENTION

The present invention is directed to overcoming one or more of the problems set forth above. Briefly summarized, according to one aspect of the present invention, a process for manufacturing a field replaceable laser writer spindle assembly having a shaft with two ball bearings and a spindle head, comprises the steps of: (a) preloading both ball bearings to a predetermined level; (b) rotating the spindle head about a longitudinal axis of the spindle assembly; and (c) grinding a reference surface of the spindle head to a predetermined tolerance for minimizing runout of the reference surface for producing the field replaceable spindle assembly.

It is an object of the present invention to provide a field replaceable spindle assembly.

It is an advantage of the present invention to produce a field replaceable spindle assembly by an efficient and easily utilized method.

It is a feature of the present invention to have ball bearings of the spindle assembly preloaded so that a spindle head of the spindle assembly may be precisely cut.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

Figure 1:
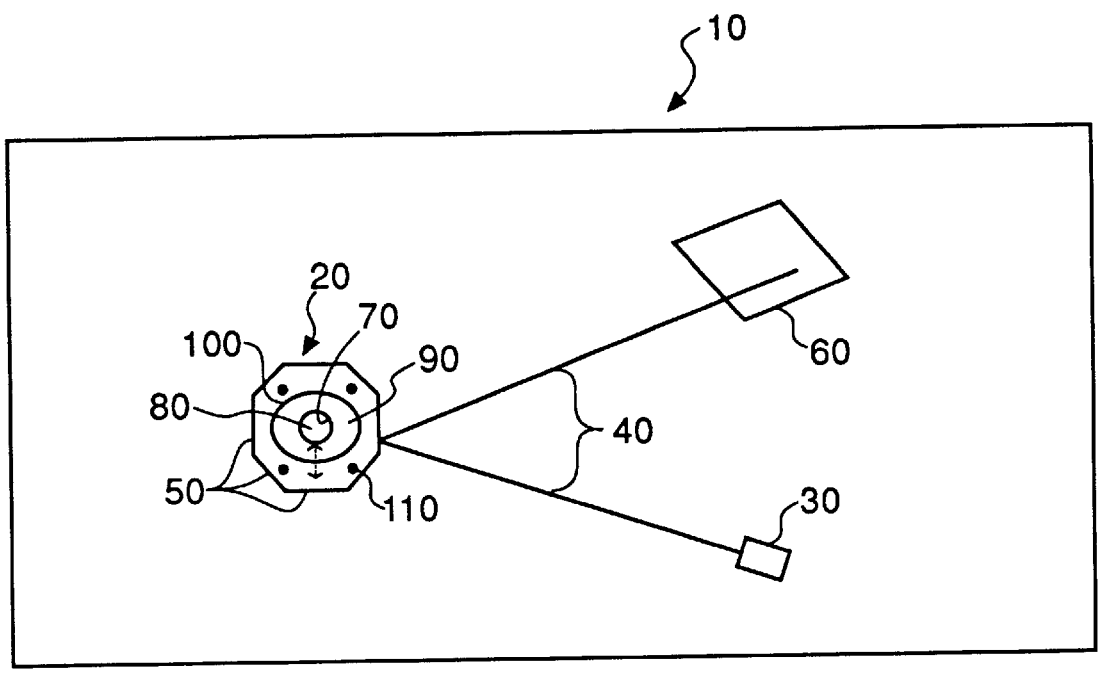
FIG. 1 is a schematic diagram of a typical laser writer for illustrating the environment of the present invention.

Referring to FIG. 1, there is shown a schematic diagram of a typical laser printer 10, which includes a polygon 20 of the present invention, for illustrating the environment of the polygon 20 of the present invention, although the polygon 20 may be implemented on any laser writing device. A laser beam source 30 directs a laser beam 40 on the polygon 20, and the beam 40 is reflected by one of a plurality of reflecting surfaces 50 onto a recording medium 60, such as paper in this embodiment. Although eight reflecting surfaces 50 are shown in the preferred embodiment, the polygon 20 may have any number of reflecting surfaces 50. The polygon 20 is mounted to a spindle assembly via a plurality of mounting screws 110 positioned respectively through the polygon 20. A center hole 70 of the polygon 20 receives the spindle assembly 80 for rotating the polygon 20 via a motor (not shown) which, in turn, permits each reflecting surface 50 to successively write an entire line onto the paper.

Figure 2:
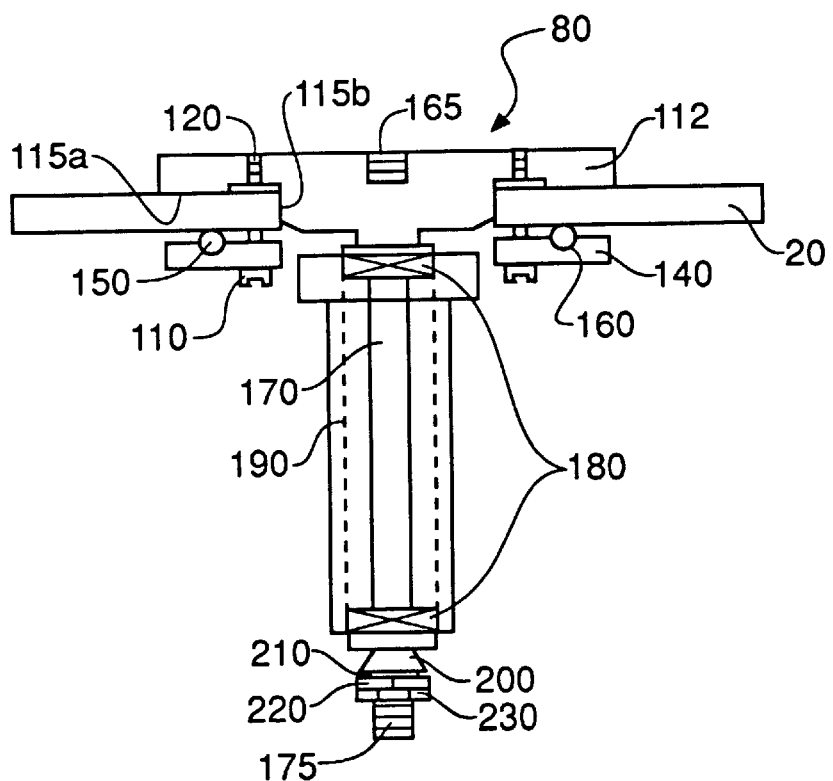
FIG. 2 is a side view of a laser writer polygon attached to a spindle assembly of the present invention.

Referring to FIG. 2, there is illustrated the polygon 20 and its associated spindle assembly 80 in detail. The spindle assembly 80 includes a spindle head 112 for permitting the polygon 20 to be attached to the spindle head 112, and two spindle reference surfaces 115a and 115b which must be precision ground to create accurate alignment of the attached polygon 20. A plurality of holes 120 extend around the spindle head 112 for respectively receiving the plurality of screws 110 which are threaded into spindle head 112. A mounting cap 140, which includes an O-ring 150 resting in a groove 160 of the cap 140, is placed adjacent to the polygon 20 and also receives the screw 110 for permitting the polygon 20 to be attached to the spindle head 112. A threaded hole 165 is positioned in the center of the spindle head 112 for permitting it to be rotated during a grinding operation, which is described in detail below.

A spindle shaft 170 is attached to the spindle head 112 and includes a pair of ball bearings 180. A bearing housing 190 surrounds the shaft 170 for enclosing the shaft 170 and ball bearings 180. The shaft 170 includes a threaded end portion 175 for receiving a preload cone 200, a wave washer 210, a preload nut 220 and a locknut 230 for preloading the ball bearings 180. To preload the ball bearings 180, the preload nut 220 is tightened so that the wave washer 210 contacts and exerts pressure on the preload cone 200 which, in turn, loads the ball bearings 180 to a predetermined level, which level will be determined by the particular ball bearings used as is well known in the art. The locknut 230 is placed adjacent the preload nut 220 and prevents the preload nut 220 from loosening.

Figure 3:
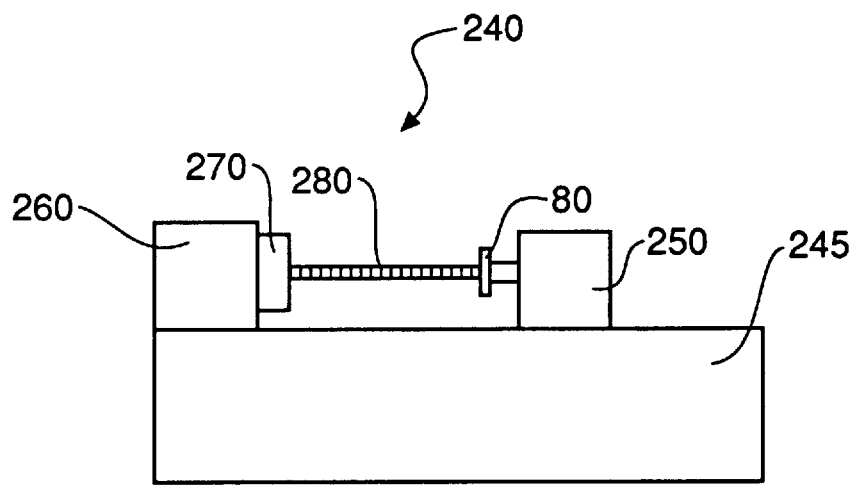
FIG. 3 is a a side view of the spindle assembly positioned in a grinding machine.
Figure 4:
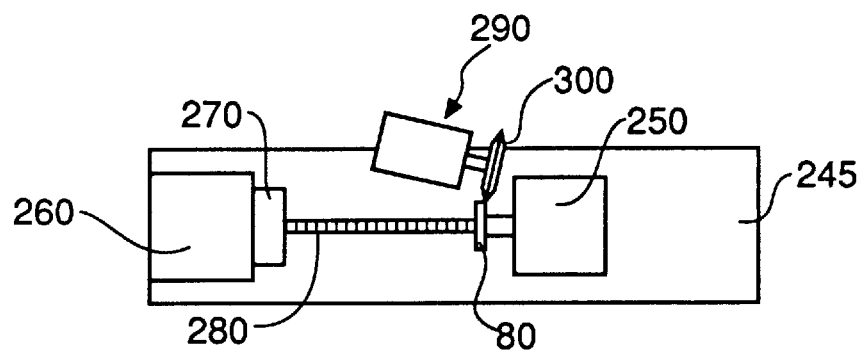
FIG. 4 is a top view of FIG. 3.

Referring to FIGS. 3 and 4, a grinding machine 240 includes a base 245 for forming the foundation of the grinding machine, and a holding fixture 250 having a hole (not shown) disposed through its center for receiving and holding the spindle assembly 80 during the grinding operation. A headstock 260 is positioned atop the grinding machine 240 for generating rotary motion which, in turn, rotates the spindle head 112. The headstock 260 includes a chuck 270 for receiving a flexible shaft 280 which is threaded into the hole 165 of the spindle head 112 which flexible shaft transmits the rotary motion of headstock 260 to the spindle assembly 80.

To grind the reference surfaces 115*a* and 115*b* of the spindle head 112, the headstock 260 is powered up to rotate at a low rpm, preferably 310 rpm, which causes the spindle assembly 80 to rotate about its longitudinal axis on its bearings 180. Since the spindle assembly 80 is rotating on its own bearings 180, all mechanical perturbations are now displaced and present on the references 115*a* and 115*b*. The mechanical perturbations are obviously caused, for example, by inaccuracies in the manufacture of the ball bearings 180 and other mechanical parts of the spindle assembly 80.

A device 290 includes an attached, rotatable grinding wheel 300 for contacting the reference surfaces 115*a* and 115*b* for purposes of grinding the surfaces 115*a* and 115*b*. While the spindle assembly 80 is rotating and with the grinding wheel 300 rotating at a significantly higher rpm than the headstock 260, preferably 3600 revolutions per minute (rpm), the reference surfaces 115*a* and 115*b* are subsequently ground to size and, consequently, the mechanical perturbations (i.e., runouts) are minimized to approximately 0.000025 inch peak to peak displacement. Since reference surfaces 115*a* and 115*b* can displace as high as 0.001 inch peak-to-peak before the grinding operation by the device 290, it is a significant improvement, resulting in a field replaceable spindle assembly.

The invention has been described with reference to a preferred embodiment. However, it will be appreciated that variations and modifications can be effected by a person of ordinary skill in the art without departing from the scope of the invention.

Parts list:
10 laser printer
20 polygon
30 laser beam source
40 laser beam
50 relecting surface
60 recording medium
70 center hole
80 spindle assembly
110 mounting screws
112 spindle head
115*a* spindle reference surface
115*b* spindle reference surface
120 holes
140 mounting cap
150 O-ring
160 groove
165 threaded hole
170 spindle shaft
175 threaded end portion
180 ball bearings
190 bearing housing
200 preload cone
210 wave washer
220 preload nut
230 locknut
240 grinding machine
245 base
250 holding fixture
260 headstock
270 chuck
280 flexible shaft
290 device
300 grinding wheel

We claim:

1. A process for manufacturing a field replaceable laser writer spindle assembly having a shaft with two ball bearings and a spindle head, comprising the steps of:

(a) preloading both ball bearings to a predetermined level;

(b) installing a preload nut onto the shaft of the spindle assembly for initiating the preloading of the ball bearings;

(c) rotating the spindle head about a longitudinal axis of the spindle assembly; and (d) grinding a reference surface of the spindle head to a predetermined tolerance for minimizing runout of the reference surface for producing the field replaceable spindle assembly.

2. The process as in claim 1 further comprising the step of reducing movement of the spindle assembly during grinding by a means for reducing movement.

3. The process as in claim 1 further comprising the step of reducing movement of the spindle assembly during grinding by a spring mechanism.

4. The process as in claim 1 further comprising the step of installing a locknut adjacent the preload nut for maintaining the preloading of the ball bearings.

5. The process as in claim 4 further comprising the step of placing a wave washer between the preload nut and ball bearings for assisting in maintaining the preloading of the ball bearings.

6. The process as in claim 5 further comprising the step of maintaining the spindle assembly generally stationary axially about the longitudinal axis of the spindle assembly during the grinding step.

* * * * *